(12) United States Patent
Inagaki et al.

(10) Patent No.: US 9,776,500 B2
(45) Date of Patent: Oct. 3, 2017

(54) SIDE COVER BODY FOR MOTORCYCLE

(71) Applicant: Kawasaki Jukogyo Kabushiki Kaisha, Hyogo (JP)

(72) Inventors: Yoshihiko Inagaki, Kakogawa (JP); Minoru Kobayashi, Kakogawa (JP)

(73) Assignee: KAWASAKI JUKOGYO KABUSHIKI KAISHA (JP)

( * ) Notice: Subject to any disclaimer, the term of this patent is extended or adjusted under 35 U.S.C. 154(b) by 0 days.

(21) Appl. No.: 14/834,283

(22) Filed: Aug. 24, 2015

(65) Prior Publication Data
US 2017/0057338 A1    Mar. 2, 2017

(51) Int. Cl.
*B60K 11/08*        (2006.01)
*B60K 11/04*        (2006.01)

(52) U.S. Cl.
CPC .............. *B60K 11/08* (2013.01); *B60K 11/04* (2013.01); *B60Y 2200/12* (2013.01)

(58) Field of Classification Search
CPC .................................. B60K 11/04; B60K 11/08
See application file for complete search history.

(56) References Cited

U.S. PATENT DOCUMENTS

| | | | |
|---|---|---|---|
| 2002/0007977 A1* | 1/2002 | Ishii | B62J 17/00 180/219 |
| 2014/0167452 A1* | 6/2014 | Nakagawa | B62J 15/00 296/198 |

* cited by examiner

*Primary Examiner* — Joseph Rocca
*Assistant Examiner* — Felicia L Brittman

(57) ABSTRACT

A side covering body for a motorcycle includes an under-the-seat covering for covering a vertical gap between a seat and a vehicle body frame from an outer side and a rear covering disposed rearwardly of the under-the-seat covering. The under-the-seat covering has a front portion formed with a shroud portion that covers an outer side of a radiator and guides the incoming wind towards the radiator. The under-the-seat covering and the rear covering are connected together via a joint portion, while having respective outer side surfaces held substantially in flush with each other. The joint portion has an upper end positioned rearwardly of an intermediate portion of the seat with respect to a forward and rearward direction.

11 Claims, 7 Drawing Sheets

SIDE COVER BODY FOR MOTORCYCLE

BACKGROUND OF THE INVENTION

Field of the Invention

The present invention relates to a side cover body mounted on a side portion of a vehicle frame structure of a motorcycle of a type having a radiator disposed forwardly of a combustion engine.

Description of Related Art

During riding of, for example, a motorcrosser which is one kind of motorcycles, the rider maneuvering the motorcrosser takes various riding positions, occasionally sitting and standing at different time or with the vehicle frame structure inclined forwards or rearwards. For this reason, the attitude of the rider changes markedly during the riding. Hence, if joints of coverings enclosing laterally outer sides of the vehicle frame structure appear below the rider's seat, the rider's clothing and/or boots, for example, may be caught by those joints

SUMMARY OF THE INVENTION

In view of the foregoing, the present invention has for its important object to provide a side cover body for a motorcycle, with which the traveling feeling of the motorcycle can be improved.

In order to accomplish the foregoing object, a first aspect of the present invention provides a side covering body for a motorcycle having a radiator disposed forwardly of a combustion engine, the side covering body being mounted on a side portion of a vehicle body of the motorcycle, which side covering body includes: an under-the-seat covering configured to cover at least a vertical gap between a seat and a vehicle frame structure; a rear covering disposed rearwardly of the under-the-seat covering; a shroud portion formed in a front portion of the under-the-seat covering and configured to cover an outer side of the radiator to thereby guide an incoming wind towards the radiator. In such case, the under-the-seat covering and the rear covering are connected together through a joint portion, while having respective outer side surface held substantially in flush with each other; and the joint portion has an upper end that is disposed rearwardly of an intermediate portion of the seat with respect to a forward and rearward direction.

According to the first aspect, the upper end of the joint portion is disposed rearwardly of the intermediate portion of the seat with respect to the forward and rearward direction or longitudinal direction of the motorcycle. Since the rider's foot extends forwardly from the seat, positioning of the upper end of the joint portion at a location rearwardly of the intermediate portion of the seat with respect to the longitudinal direction is effective to avoid the possibility that the rider's outfit such as clothing and boot may be caught by the joint portion. Accordingly, the traveling feeling increases. Also, the outer side surface of the under-the-seat covering and the outer side surface of the rear covering are in flush with each other. Accordingly, even though the under-the-seat covering and the rear covering are somewhat displaced in position in the vehicle widthwise direction as a result of an error in shape, a fitting error and an aged deterioration or the like, the possibility of the rider's clothing and boot being caught by the joint portion can be avoided. Furthermore, thanks to the use of the shroud portion, the incoming wind can be smoothly guided towards the radiator.

A second aspect of the present invention provides a side covering body for a motorcycle having a radiator disposed forwardly of a combustion engine, the side covering body being mounted on a side portion of a vehicle body of the motorcycle, which side covering body includes: an under-the-seat covering to cover at least a vertical gap between a seat and a vehicle frame structure; a rear covering disposed rearwardly of the under-the-seat covering; and a shroud portion formed in a front portion of the under-the-seat covering and configured to cover an outer side of the radiator to thereby guide an incoming wind towards the radiator. In such case, the under-the-seat covering and the rear covering are connected together through a joint portion, while having respective outer side surface held substantially in flush with each other, and the joint portion has an upper end that is, when viewed from side, disposed spaced a distance below a rear portion of the seat.

According to the second aspect of the present invention, the outer side surface of the under-the-seat covering and the outer side surface of the rear covering are held substantially in flush with each other and, therefore, even though the under-the-seat covering and the rear covering are somewhat displaced in position in the motorcycle widthwise direction because of, for example, the error in shape, the mounting error and the aged deterioration, the possibility of, for example, the rider's clothing and boot being caught by the joint portion can be avoided. Accordingly, the traveling feeling improves. Also, the use of the shroud is effective to smoothly guide the incoming wind towards the radiator.

A third aspect of the present invention provides a side covering body for a motorcycle having a radiator disposed forwardly of a combustion engine, the side covering body being mounted on a side portion of a vehicle body of the motorcycle, which side covering body includes: an under-the-seat covering configured to cover at least a vertical gap between a seat and a vehicle frame structure; a rear covering disposed rearwardly of the under-the-seat covering; and a shroud portion formed in a front portion of the under-the-seat covering and configured to cover an outer side of the radiator to thereby guide an incoming wind towards the radiator. In such case, the under-the-seat covering and the rear covering are connected together through a joint portion, while having respective outer side surface held substantially in flush with each other, and the joint portion has an upper end which is, when viewed from side, so positioned as to lie within a region inclined rearwardly at an angle within the range of 15 to 35° relative to a base line extending in a vertical direction from an upper surface of a rider's footstep.

According to the third aspect of the present invention, the upper end of the joint portion, when viewed from side, is so positioned as to lie within the region that is inclined rearwardly within the range of 15 to 35° relative to the base line extending in the vertical direction from an upper surface of the rider's footstep. Since the rider's leg extends forwardly from the seat, the rider's clothing and boot, for example, will not be caught by the joint portion, if the upper end of the joint portion is so positioned as to lie within the region that is inclined rearwardly within the range of 15 to 35° relative to the base line extending in the vertical direction from the upper surface of the rider's footstep. Accordingly, the traveling feeling improves. Also, since the outer side surface of the under-the-seat covering and the outer side surface of the rear covering are held substantially in flush with each other, even though the under-the-seat covering and the rear covering are somewhat displaced in position in the motorcycle widthwise direction because of, for example, the error in shape, the mounting error and the aged deterioration, the possibility of, for example, the rider's clothing and boot being caught by the joint portion can be avoided. Furthermore, the use of the shroud is effective to smoothly guide the incoming wind towards the radiator.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF PREFERRED EMBODIMENTS

A preferred embodiment of the present invention will be described in detail with particular reference to the accompanying drawings. Before the description of the present invention proceeds, it is to be noted that the terms "left" and "right" are herein used to denote opposite positions or directions, respectively, relative to a motorcycle rider or motorist then occupying a motorcycle rider's seat and looking forwards in a direction parallel to the longitudinal sense of the motorcycle.

Figure 1:
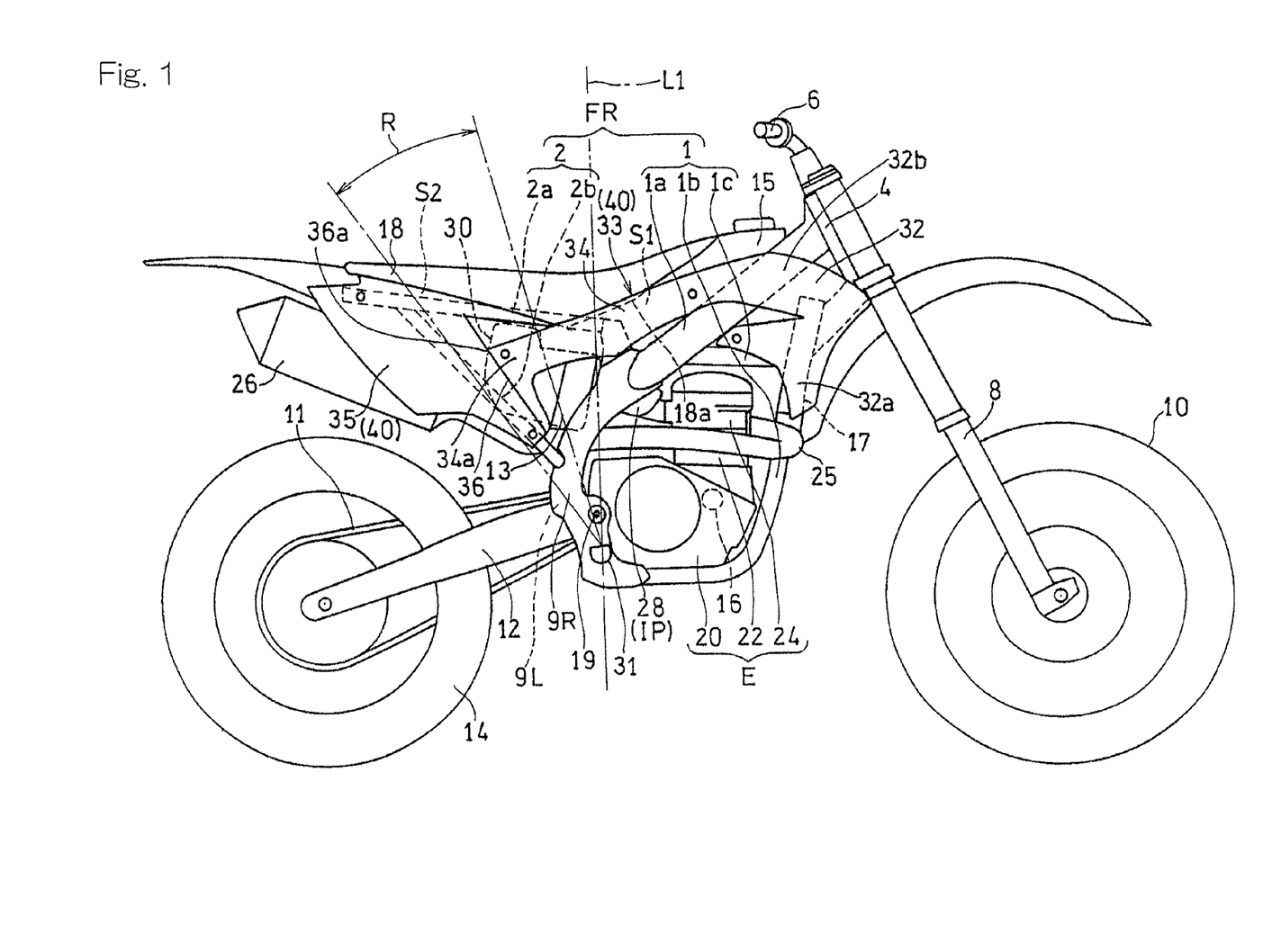
FIG. 1 is a schematic side view of a motorcycle equipped with a side covering body designed in accordance with a preferred embodiment of the present invention.

FIG. 1 is a schematic side view showing a motorcycle equipped with a side covering body designed in accordance with the preferred embodiment of the present invention. The illustrated motorcycle is of a type used for running on a rough terrain and is generally referred to as a single seater motorcrosser. A vehicle frame structure FR of the motorcycle includes a front frame unit 1 forming a front half part of the frame structure FR and a rear frame unit 2 forming a rear half part of the frame structure FR.

Figure 2:
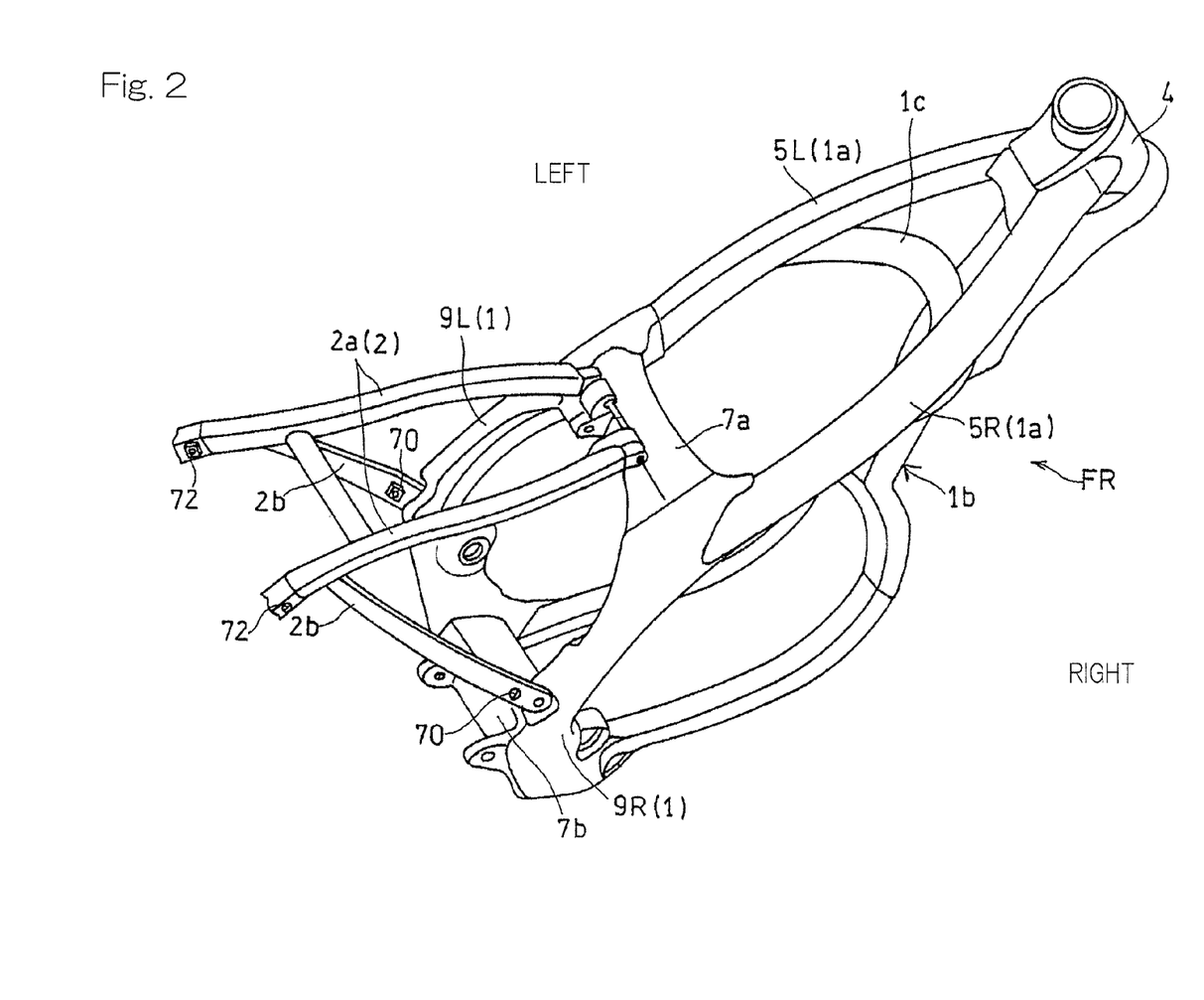
FIG. 2 is a perspective view showing a frame structure of the motorcycle.

The front frame unit 1 includes a main frame 1a extending rearwardly downwardly from a head pipe 4, a lower frame 1b extending downwardly from the head pipe 4 and then extending rearwardly so as to terminate at and be connected with a lower end of the main frame 1a, and a subframe 1c connecting between the main frame 1a and the lower frame 1b. As shown in FIG. 2, the main frame 1a is made up of a pair of left and right frame pieces 5L and 5R. Respective major portions of the frame pieces 5L and 5R are so designed and so configured as to gradually flare rearwardly outwardly.

As shown in FIG. 1, the frame pieces 5L and 5R form corresponding front half portions of the main frame 1a and a rear half portion of the main frame 1a is, as shown in FIG. 2, defined by a pair of left and right swingarm brackets 9L and 9R. While the frame pieces 5L and 5R are prepared from a rolled product or a cast product, the swingarm brackets 9L and 9R are prepared from a forged product and are fixedly connected with respective rear end portion of the frame pieces 5L and 5R by means of, for example, welding. Respective upper and lower end portions of the left and right swingarm brackets 9L and 9R are connected with each other by means of an upper cross member 7a and a lower cross member 7b, both of which extend in a leftward and rightward direction (a direction parallel to the widthwise direction of the motorcycle).

The lower frame 1b extends downwardly from a lower portion of the head pipe 4 and is ramified leftward and rightward at such downward position. The lower frame 1b, which has been ramified leftward and rightward, further extends rearwardly and is then connected with the lower cross member 7b. The subframe 1c is of a generally U-shaped configuration opening rearwards, when viewed from top, and left and right branch portions at a rear end thereof are connected respectively with the left and right frame pieces 5L and 5R while a base portion at a front end thereof is connected with the lower frame 1b.

On the other hand, the rear frame unit 2 is made up of a pair of left and right seat rails 2a and 2a connected respectively with rear portions of the frame pieces 5L and 5R so as to extend rearwardly therefrom, and a pair of left and right reinforcement rails 2b and 2b. The reinforcement rails 2b are connected with the swingarm bracket 9 at a location below the seat rails 2a and extend diagonally rearwardly and upwardly therefrom before they are connected with the seat rails 2a at rear end portions thereof.

A front fork 8 is rotatably supported by the head pipe 4 through a steering shaft (not shown). The front fork 8 has its upper end portion on which a handlebar 6 for steering purpose is fixedly mounted, and a front wheel 10 is fitted to a lower end portion of the front fork 8. On the other hand, about a pivot pin 19 fitted to the swingarm brackets 9L and 9R, the swingarm 12 is supported for swinging motion in a direction up and down or vertical direction. The swingarm 12 has a rear end portion by which a rear wheel 14 is rotatably supported. Between the upper cross member 7a (best shown in FIG. 2) and the swingarm 12, a rear suspension 13 is suspended for absorbing shocks imposed on the rear wheel 14 from the road surface. The rear suspension 13 employed in the present preferred embodiment is a so-called single suspension and is disposed at an intermediate portion of the motorcycle body with respect to the motorcycle widthwise direction.

At a location below the main frame 1a and upwardly of the lower frame 1b, a motorcycle combustion engine E is disposed and is fitted to the motorcycle frame structure FR. The combustion engine E drives the rear wheel 14 through a drive chain 11. The combustion engine E employed in the present preferred embodiment is a single cylinder internal combustion engine. It is, however, to be noted that the combustion engine may not be necessarily limited thereto. The combustion engine E includes a crankcase 20 supporting a crankshaft 16 which is an engine rotary shaft, a cylinder 22 protruding upwardly from an upper surface of a front portion of the crankcase 20, and a cylinder head 24 positioned above the cylinder 22. A radiator 17 for cooling an engine cooling water is disposed forwardly of the combustion engine E.

A fuel tank 15 is disposed above the combustion engine E and is supported on an upper portion of the main frame 1a by means of a threaded body (not shown). A single rider's seat 18 is supported by the seat rails 2a at a location rearwardly of the fuel tank 15. The rider's seat 18 is so formed as to have a substantial length in a forward and rearward direction or longitudinal direction of the motorcycle, with its front end portion positioned above a rear portion of the fuel tank 15 so as to cover an upper surface of the rear portion of the fuel tank 15. A rear end of the rider's seat 18 is positioned above the rear wheel 14. A rider's footstep 31 is fitted to an outer side face of a lower end portion of each of the left and right swingarm brackets 9L and 9R. The rear suspension 13 referred to previously is positioned at a location below an intermediate portion of the rider's seat 18 with respect to the forward and rearward direction.

An exhaust pipe 25 is fluid connected with a front surface of the cylinder head 24 of the combustion engine E. This exhaust pipe 25 guides exhaust gases of the combustion engine E from the front surface of the cylinder head 24 in a rearward direction by way of a location above the crankcase 20 and laterally of the cylinder head 24 and is fluid connected with an exhaust muffler 26 that is disposed above the rear wheel 14.

A throttle body 28 for introducing an intake air into the combustion engine E is fluid connected with a rear surface of the cylinder head 24. An air cleaner 30 is positioned rearwardly of the throttle body 28 and is fluid connected with the throttle body 28. The air cleaner 30 is disposed below the intermediate location of the rider's seat 18 with respect to the forward and rearward direction. The air cleaner 30 is operable to take in an external air as an engine intake air, and supply it, after having substantially purified the air, to the throttle body 28. In this way, the combustion engine E, the throttle body 28 and the air cleaner 30 are disposed in sequence from front to rear of the motorcycle.

The motorcycle has an upper portion covered from an outer lateral side by an under-the-seat covering 33 and a rear covering 35 positioned rearwardly of the under-the-seat covering 33. The under-the-seat covering 33 covers from laterally outer side a region ranging from laterally outer side of the radiator 17 to a lateral outer side of the fuel tank 15 and a vertical gap S1 delimited between the front portion of the rider's seat 18 and the motorcycle frame structure FR. On the other hand, the rear covering 35 covers from a lateral outer side a region ranging from a vertical gap S2, delimited between a rear portion of the rider's seat 18 and the motorcycle frame structure FR, to an upper portion of the exhaust muffler 26. This under-the-seat covering 33 and the rear covering 35 cooperate with each other to define a side covering body 40 that is mounted on a lateral side portion of the motorcycle body.

The under-the-seat covering 33 is of a single molded product prepared from a synthetic resin. The under-the-seat covering 33 has a front portion formed with a shroud portion 32 covering an outer side of the radiator 17 so that the incoming wind can be guided into the radiator 17. The shroud portion 32 referred to above, when viewed from side, represents a generally V-shaped configuration opening rearwardly. A lower side branch piece 32a of the V-shaped configuration covers an outer side of a lower portion of the radiator 17 and an upper side branch piece 32b thereof covers an outer side of an upper portion of the radiator 17. With the incoming wind smoothly guided by the shroud portion 32 into the radiator 17, the heat dissipating capability of the radiator 17 is increased. A side covering segment 34 extending rearwardly from a rear end of the upper side branch piece 32b of the shroud portion 32 covers a region ranging from an outer side of the fuel tank 15 to an outer side of a lower area of the front half portion of the seat 18.

The side covering segment 34 of the under-the-seat 33 extends to a position rearwardly beyond the rear suspension 13 and, when viewed from side, covers a lower end portion 18a of the front half portion of the seat 18 from an outer side. The side covering segment 34 of the under-the-seat covering 33 has its rear portion disposed rearwardly beyond a front end portion of the air cleaner 30. In other word, the under-the-seat covering 33 extends from the front end portion of the seat 18 to a position rearwardly of the front end portion of the air cleaner 30.

A rear edge 34a of the side covering segment 34 of the under-the-seat covering 33 extends in close proximity to a front edge 35a of the rear covering 35. Specifically, the rear edge 34a of the side covering segment 34 of the under-the-seat covering 33 and the front edge 35a of the rear covering 35 are connected with each other through a joint portion 36 with their outside surfaces held substantially in flush with each other. The joint portion 36 includes an abutment face of the rear edge 34a of the under-the-seat covering 33 and an abutment face of the front edge 35a of the rear covering 35, and extends, when viewed from side, diagonally upwardly and rearwardly. In other words, an upper end 36a of the joint portion 36 forms a rear end of the under-the-seat covering 33. The upper end 36a of the joint portion 36 is disposed rearwardly beyond the intermediate portion of the seat 18 with respect to the forward and rearward direction. Also, the upper end 36a of the joint portion 36 is, when viewed from side, disposed spaced a distance downwardly from the seat 18.

The rear end of the under-the-seat covering 33, that is, the upper end 36a of the joint portion 36 is preferably positioned within a region R that is inclined rearwardly at an angle within the range of 15 to 35° and, more preferably, within the range of 20 to 30° with respect to a base line L1 extending from an upper face of the rider's footstep 31 in a vertical direction. It is, however, to be noted that in describing the preferred embodiment the upper end 36a of the joint portion 36 is positioned at a location rearwardly inclined 25° relative to the base line L1.

Figure 3:
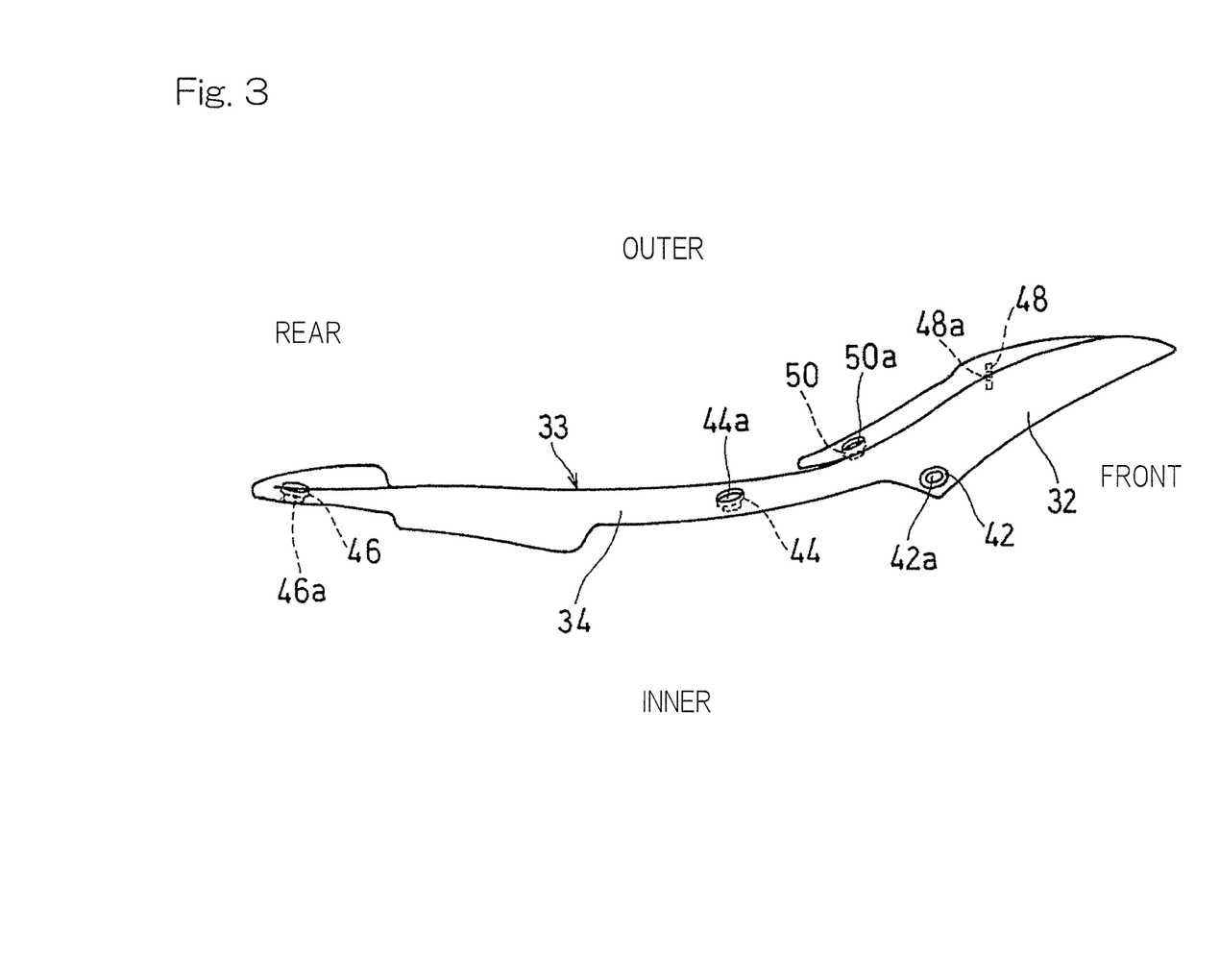
FIG. 3 is a schematic top plan view showing an under-the-seat covering forming a part of the side covering body.
Figure 4:
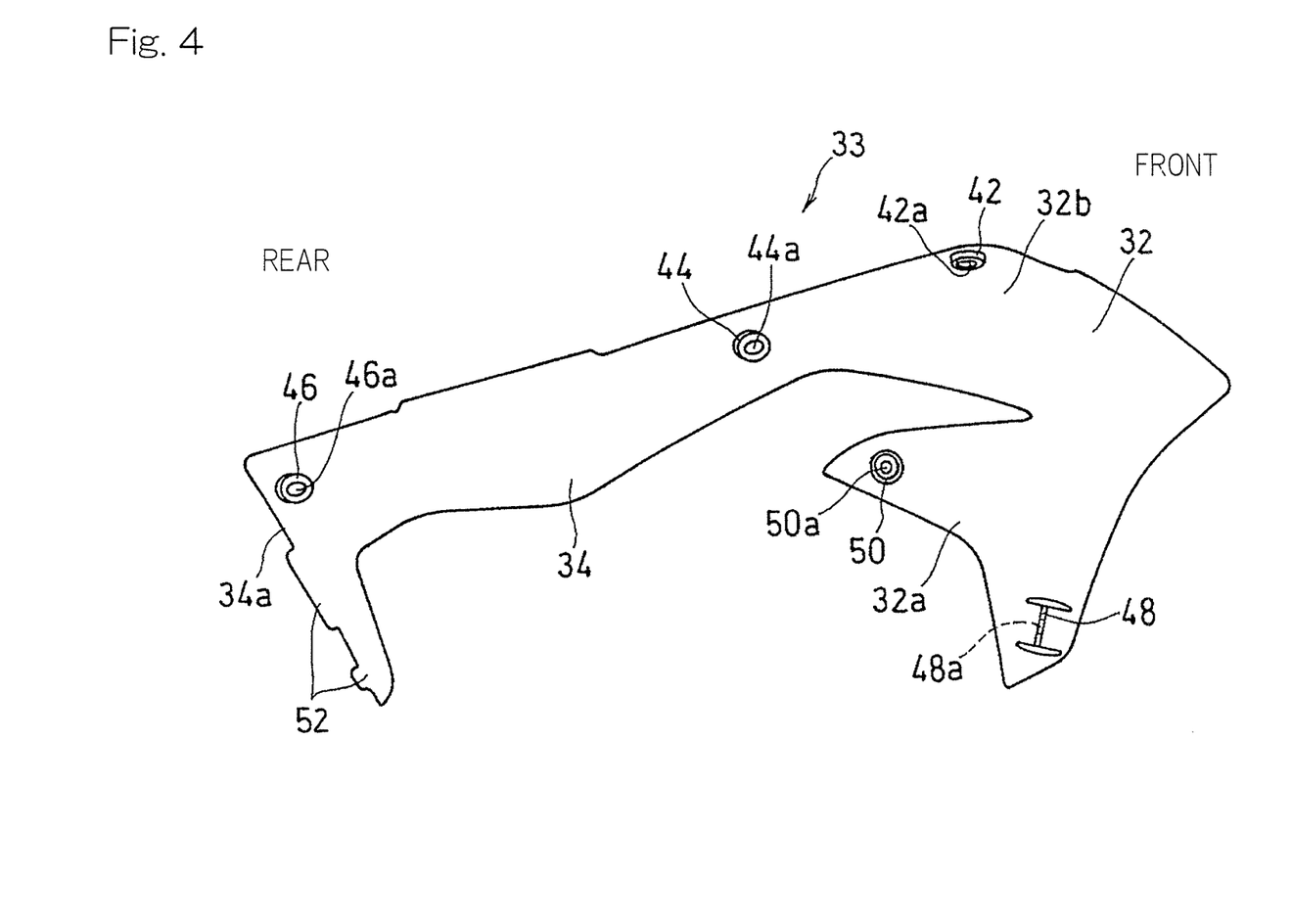
FIG. 4 is a schematic inner surface view showing the under-the-seat covering.

FIG. 3 illustrates a schematic top plan view of the left under-the-seat covering 33 and FIG. 4 illustrates an inner side surface view. Since the left and right under-the-seat coverings 33 are of a symmetrical construction, reference will be made only to the left under-the-seat covering 33 in the description that follows for the sake of brevity. As shown in FIG. 3, the under-the-seat covering 33 is formed with first, second and third bosses 42, 44 and 46 in a region ranging from a front portion thereof to a rear portion thereof. As shown in FIG. 4, the first boss portion 42 is formed in an upper end portion of an inner surface of the under-the-seat covering 33 so as to protrude downwardly. Specifically, the first boss portion 42 is formed in an upper portion of the upper branch piece 32b of the shroud portion 32 of the under-the-seat covering 33. The first boss portion 42 has a first insertion hole 42a defined therein so as to be oriented in an up and down direction or vertical direction.

The second boss portion 44 referred to above is formed in an intermediate portion of the inner surface of the under-the-seat covering 33 with respect to the forward and rearward direction so as to protrude inwardly of the motorcycle widthwise direction. Specifically, the second boss portion 44 is formed in a front portion of the side covering segment 34 of the under-the-seat covering 33. The second boss portion 44 also has a second insertion hole 44a defined therein so as to be oriented in the leftward and rightward direction (motorcycle widthwise direction).

The third boss portion 46 is formed in a rear end portion of the inner surface of the side covering segment 34 of the under-the-seat covering 33 so as to protrude in a direction inwardly of the motorcycle widthwise direction. Even the third boss portion 46 has a third insertion hole 46a defined therein so as to be oriented in a leftward and rightward direction (motorcycle widthwise direction).

A fourth mounting portion 48, which represent a plate shape oriented in the forward and rearward direction, is formed in a lower portion of the front portion of the inner surface of the under-the-seat covering 33. Specifically, the fourth mounting portion 48 is formed in the lower portion of the front portion of the lower branch piece 32a of the shroud portion 32 of the under-the-seat covering 33. The fourth mounting portion has a fourth insertion hole 48a defined therein so as to be oriented in the forward and rearward direction, as shown in FIG. 3.

An intermediate portion of the inner surface of the under-the-seat covering 33 shown in FIG. 4 with respect to the forward and rearward direction and also with respect to the vertical direction is formed with a fifth boss portion 50 so as to protrude in a direction inwardly of the motorcycle widthwise direction. Specifically, the fifth boss portion 50 is formed in a rear end portion of the lower branch piece 32a of the shroud portion 32 of the under-the-seat covering 33. Even the fifth boss portion 50 has a fifth insertion hole 50a defined therein so as to be oriented in the leftward and rightward direction (motorcycle widthwise direction).

The rear end edge 34a of the side covering segment 34 of the under-the-seat covering 33 has an engagement piece 52 formed therein. The engagement piece 52 is in the form of a plate protruding rearwardly so as to extend along the rear end edge 34a of the side covering segment 34 and is formed integrally with the under-the-seat covering 33 by means of a molding technique. In the embodiment now under discussion, the engagement piece 52 are provided at two locations spaced apart from each other in a direction along the rear end edge 34a.

Figure 5:
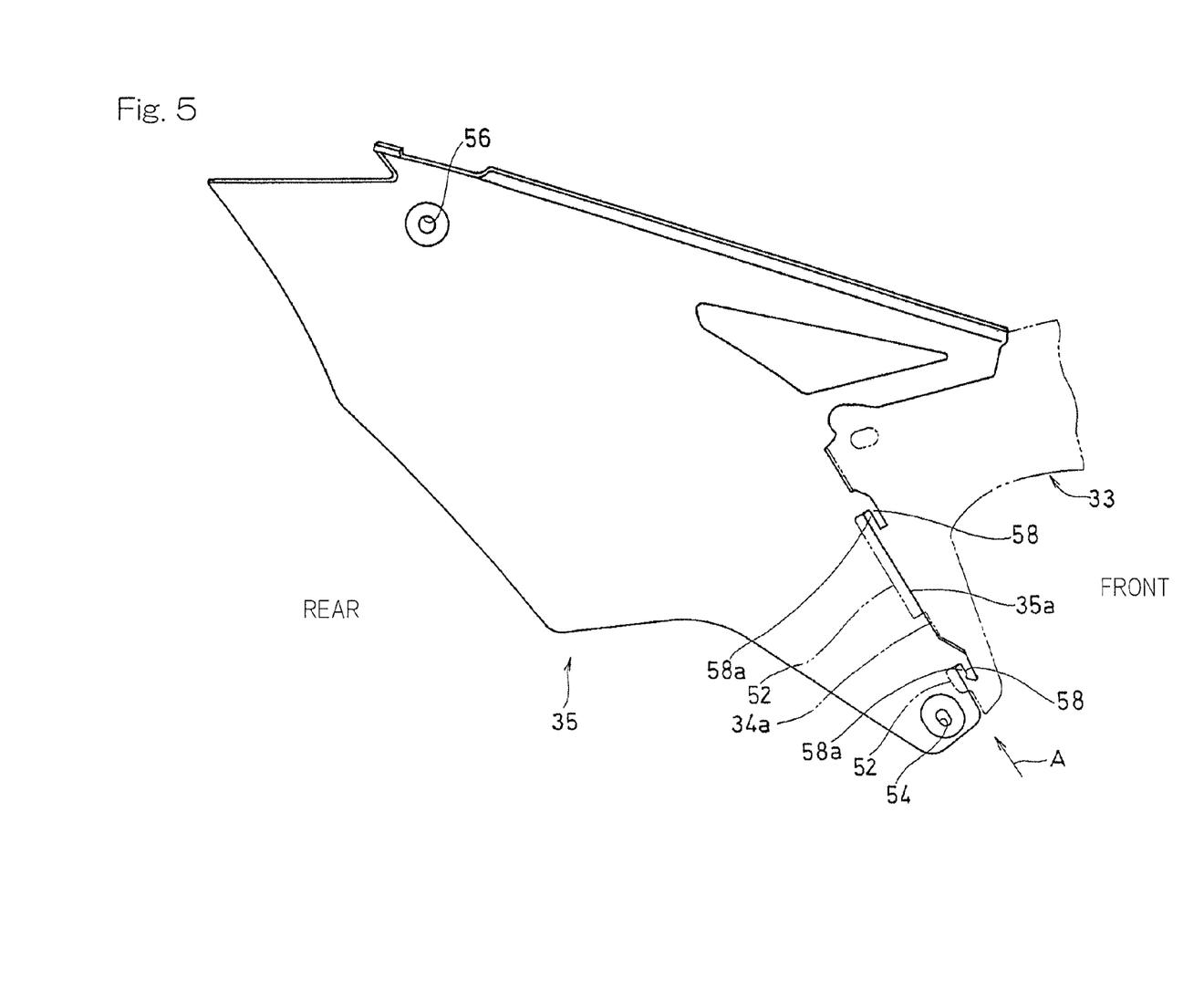
FIG. 5 is a schematic inner surface view showing a rear covering forming another part of the side covering body.

FIG. 5 is an inner side surface view of the left rear covering 35. Since the left and right rear coverings 35 are of a symmetrical construction, reference will be made only to the left rear covering 35 for the sake of brevity in describing the preferred embodiment. A front end portion, specifically a lower end portion of the front end portion, of the rear covering 35 is formed with a sixth insertion hole 54 that is oriented in the motorcycle widthwise direction. Also, a rear portion, specifically an upper end portion of the rear portion, of the rear covering 35 is formed with a seventh insertion hole 56 that is oriented in the motorcycle widthwise direction. Again, the front edge 35a of the rear covering 35 is formed with a to-be-engaged piece 58 engageable with the engagement piece 52. The to-be-engaged piece 58 is in the form of a projecting piece protruding forwardly and has a cutout 58a defined therein so as to extend along the front edge 35a. The to-be-engaged piece 58 is provided at two locations spaced a distance in a direction along the front edge 35a.

Figure 6:
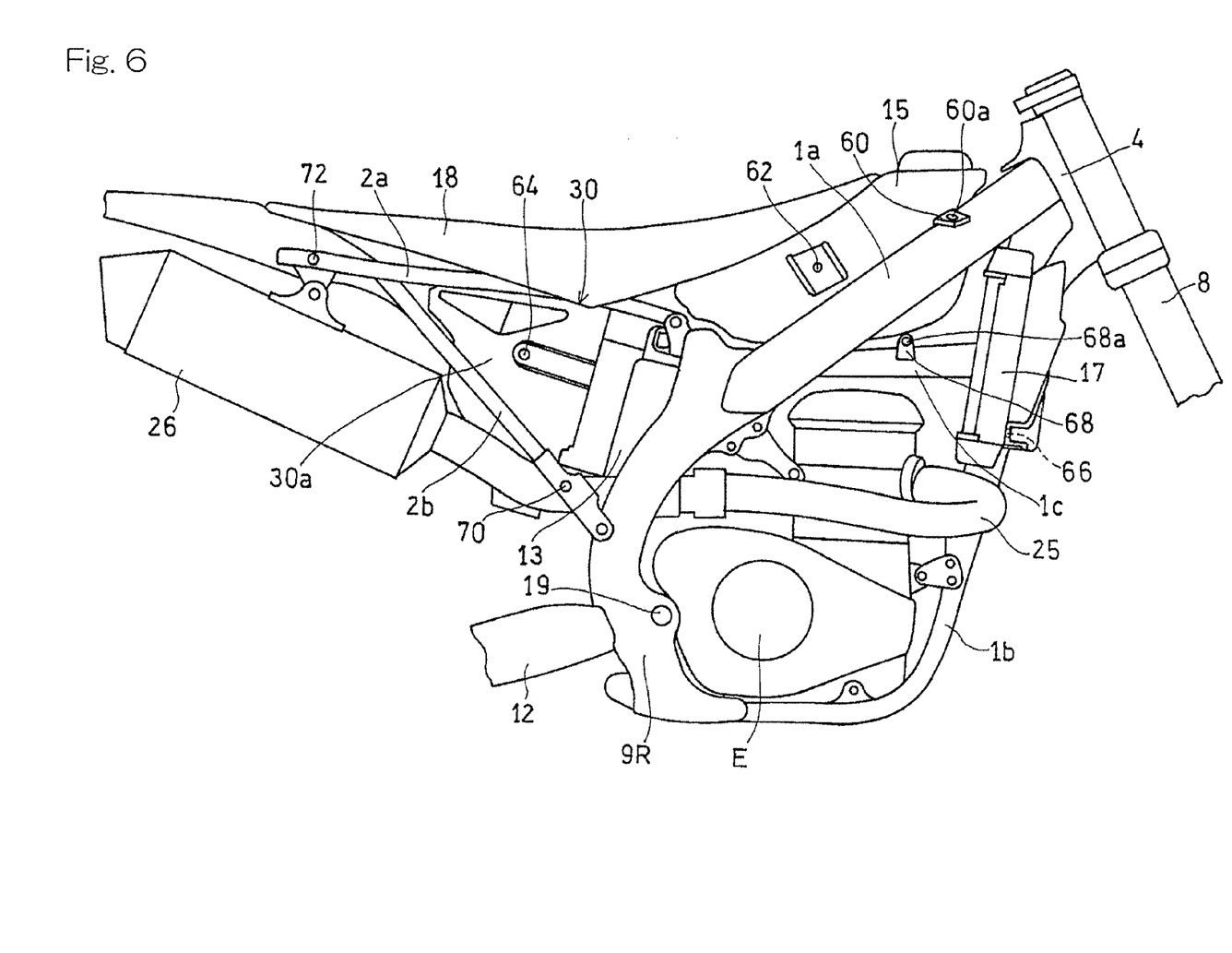
FIG. 6 is a schematic side view showing, on an enlarged scale, a portion of the motorcycle with the side covering body removed.

FIG. 6 illustrates the motorcycle in a condition with the side covering body 40 removed. As shown therein, a first mounting piece 60 extending laterally outwardly is formed in an upper portion of a front portion of the fuel tank 15. A first throughhole 60a is formed in the first mounting piece 60 so as to be oriented in the vertical direction. Also, a first threaded hole 62 is formed in an intermediate portion of the outer side surface of the fuel tank 15 with respect to the forward and rearward direction. The first threaded hole 62 is in the form of, for example, a nut formed in the fuel tank 15 of a resinous material by the use of any known insert molding technique.

The air cleaner 30 referred to previously includes a cleaner box 30a, made of a synthetic material, and a cleaner element accommodated within the cleaner box 30a, which element substantially purifies an air. A second threaded hole 64 oriented in the motorcycle widthwise direction is formed in an outer side surface of the cleaner box 30a. The second threaded hole 64 is in the form of, for example, a nut formed in the cleaner box 30a by the use of any known insert molding technique. Also, a second throughhole 66 oriented in the forward and rearward direction is formed in a side portion of a lower portion of the radiator 17. Yet, a second mounting piece 68 is secured to an outer side surface of the subframe 1c by means of welding, and a third threaded hole 68a oriented in the motorcycle widthwise direction is formed in the second mounting piece 68. The third threaded hole 68a referred to above is in the form of, for example, a weld nut.

A fourth threaded hole 70 oriented in the motorcycle widthwise direction is formed in a lower, portion of a front portion of the reinforcement rail 2b. The fourth threaded hole 70 employed in the present embodiment is constituted by a weld nut. Also, a fifth threaded hole 72 oriented in the motorcycle widthwise direction is formed in a rear end of the seat rail 2a. The fifth threaded hole 72 and employed in this embodiment is constituted by a weld nut.

The manner of mounting the rear covering 35 and the under-the-seat covering 33, both best shown in FIG. 7, onto the motorcycle body will now be described. The mounting of the rear covering 35 and the under-the-seat covering 33 is performed for and on each side of the motorcycle body in the same way and, accordingly, in the description that follows, only the mounting of the right rear covering 35 and the right under-the-seat covering 33 onto the motorcycle body will be described for the sake of clarity.

At the outset, the rear covering 35 is fitted. Specifically, bolts 74 and 75 are inserted from laterally outward into the sixth insertion hole 54 and the seventh insertion hole 56 in the rear covering 35, respectively, with those bolts 74 and 75 eventually threaded into the fourth and fifth threaded holes 70 and 72 in the rear frame 2 (as shown in FIG. 6), to thereby fasten the rear covering 35 to the motorcycle body.

Subsequently, the under-the-seat covering 33 is fitted to the motorcycle body. At the outset, the engagement piece 52 in the under-the-seat covering 33 is engaged with the to-be-engaged piece 58 in the rear covering 35. Specifically, as shown in FIG. 5, in a condition in which the rear edge 34a of the under-the-seat covering 33 is held in abutment with the front edge 35a of the rear covering 35, the under-the-seat covering 33 is displaced in a direction, shown by the arrow A, along the front edge 35a of the rear covering 35. By so doing, the engagement piece 52 of the under-the-seat covering 33 is engaged in the cutout 58a in the to-be-engaged piece 58 of the rear covering 35, with the under-the-seat covering 33 being consequently positioned.

Figure 7:
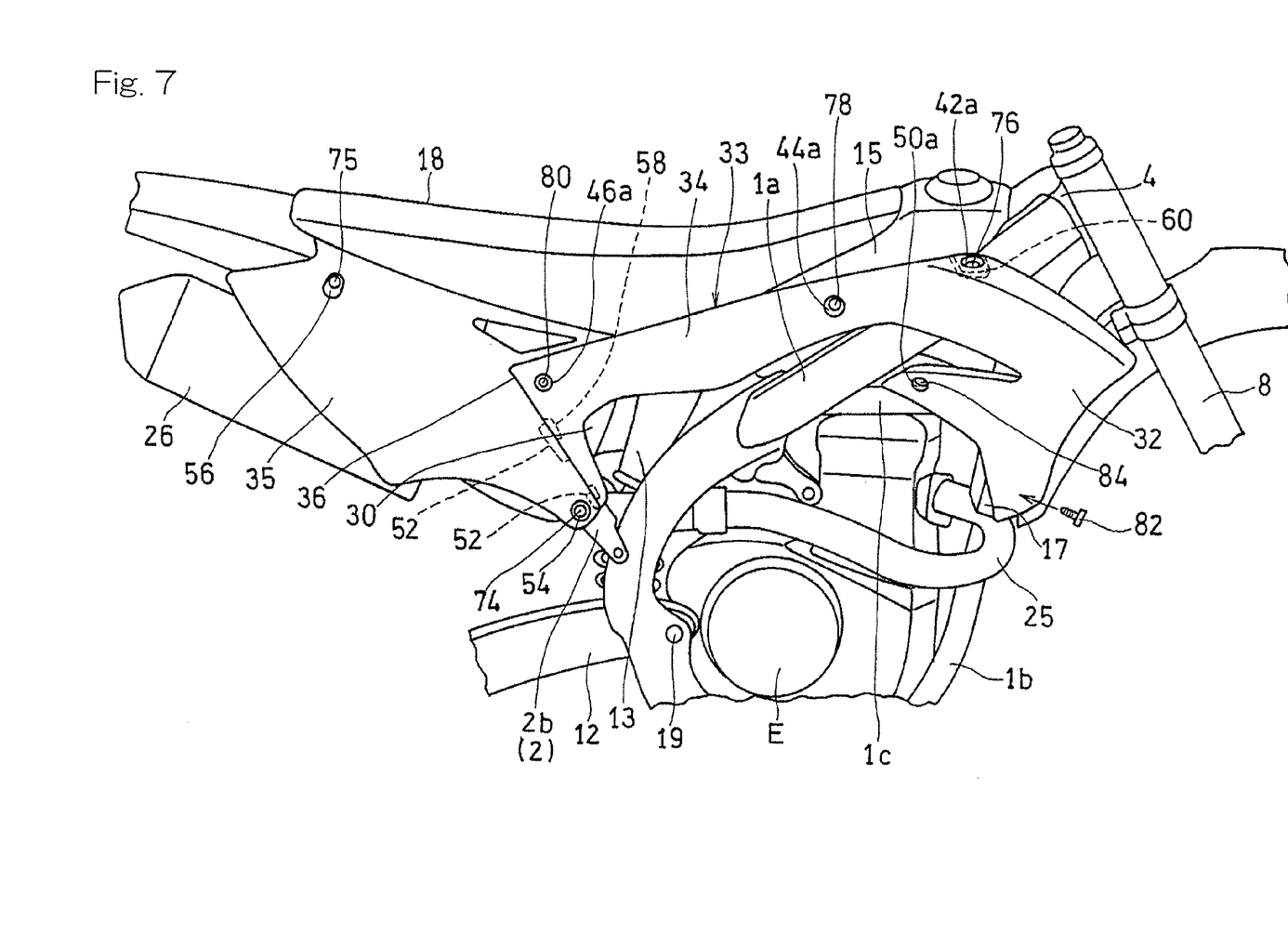
FIG. 7 is a perspective view showing the motorcycle on an enlarged scale.

Thereafter, the upper portion of the front portion of the under-the-seat covering 33 shown in FIG. 7 is supported by the fuel tank 15. Specifically, a blind nut (not shown) made of an elastic material such as rubber is mounted in the first throughhole 60a (shown in FIG. 6) in the first mounting piece 60 of the fuel tank 15. Following the mounting of the blind nut, a blot 76 is inserted from above into the first insertion hole 42a in the under-the-seat covering 33 and is then fastened to the blind nut. By so doing, the upper portion of the front portion of the under-the-seat covering 33 is fitted to the motorcycle body through the fuel tank 15 with the use of the bolt 76 in the vertical direction.

Then, a blot 78 is inserted from an outer side into the second insertion hole 44a in the under-the-seat covering 33 and is subsequently fastened to the first threaded hole 62 provided in the fuel tank 15 (shown in FIG. 6). By so doing, the intermediate portion of the under-the-seat covering 33 with respect to the forward and rearward direction is supported by the fuel tank 15. Also, a blot 80 is inserted from an outer side into the third insertion hole 46a in the under-the-seat covering 33 and is then fastened to the second threaded hole 64 (FIG. 4) that is provided in the air cleaner 30. By so doing, the rear portion of the under-the-seat covering 33 is supported by the air cleaner 30.

The lower portion of the front portion of the under-the-seat covering 33 is supported by the radiator 17. Specifically, a blind nut (not shown) made of an elastic material such as, for example, rubber is mounted in the second throughhole 66 (shown in FIG. 6) in the radiator 17. Then, a blot 82 is inserted from front into the fourth insertion hole 48a (shown in FIG. 4) in the under-the-seat covering 33, followed by fastening to the blind nut. By so doing, the lower portion of the front portion of the under-the-seat covering 33 is fitted to the motorcycle body through the radiator 17 with the use of the bolt 82 in the forward and rearward direction.

In addition, a bolt 84 is inserted from an outer side into the fifth insertion hole 50a in the under-the-seat covering 33 and is fastened to the third threaded hole 68a (shown in FIG. 6) provided in the subframe 1c. By so doing, a rear end portion of the shroud portion 32 of the under-the-seat covering 33 is supported by the subframe 1c.

Since the under-the-seat covering 33 is formed so as to wide in the forward and rearward direction and is a component part with which the rider's knee and boot contact, a firm support to the motorcycle body is desired. In the embodiment now under discussion, the under-the-seat covering 33 is fitted directly or indirectly to the motorcycle frame structure FR by the bolt 76 in the vertical direction, the bolts 78, 80 and 84 in the motorcycle widthwise direction and the bolt 82 in the forward and rearward direction and, therefore, the under-the-seat covering is firmly supported.

According to the preferred embodiment, the upper end 36a of the joint portion 36 between the under-the-seat covering 33 and the rear covering 35 shown in FIG. 1 is disposed rearwardly beyond the intermediate portion of the seat 18 with respect to the forward and rearward direction. Since the rider's legs extend forwardly from the seat 18, positioning of the upper end 36a of the joint portion 36 at a location rearwardly beyond the intermediate portion of the seat 18 with respect to the forward and rearward direction is effective to avoid, for example, the rider's clothing and/or boot from being caught by the joint portion 36. Accordingly, the traveling feeling improves. Also, since the outer side surface of the under-the-seat covering 33 and the outer side surface of the rear covering 35 are substantially in flush with each other, the possibility of, for example, the rider's clothing and/or boot being caught by the joint portion 36 can be avoided even though the under-the-seat covering 33 and the rear covering 35 are somewhat displaced in position in the motorcycle widthwise direction because of, for example, an error in shape, a fitting error and an aged deterioration.

The rear portion of the under-the-seat covering 33 is disposed rearwardly of the front end portion of the air cleaner 30. Specifically, the under-the-seat covering 33 extends rearwardly from the front end portion of the seat 18 to a position rearwardly of the front end portion of the air cleaner 30 and the rear suspension 13. According to this design, the upper end 36a of the joint portion 36 is positioned sufficiently rearwardly and, therefore, the possibility that the rider's clothing and boot may be caught by the joint portion 36 can be avoided. Also, since the rear portion of the under-the-seat covering 33 is supported by the outer side surface of the air cleaner 30, an undesirable deformation of the rear portion of the under-the-seat covering 30 in a direction inwardly with respect to the motorcycle widthwise direction can be suppressed.

The upper region of the front portion of the under-the-seat covering 33 is supported by the front portion of the fuel tank 15, and also the intermediate portion of the under-the-seat covering 33 with respect to the forward and rearward direction is supported by the fuel tank 15. Accordingly, the possible deformation of the upper portion of the front portion of the under-the-seat covering 33 can be prevented, and also the support of the under-the-seat covering 33 is stabilized. Also, since the front portion of the under-the-seat covering 33 is supported by the subframe 1c connected with the main frame 1a, the support of the under-the-seat covering 33 is further stabilized.

Since the under-the-seat covering 33, when viewed from side, covers the lower end portion of the seat 18 from an outer side and the rear edge 34a of the under-the-seat covering 33 extends in adjoining relation or in substantial contact with the front edge 35a of the rear covering 35, the exterior appearance of the motorcycle body improves. Also, even though a somewhat gap occurs between the rear edge 34a of the under-the-seat covering 33 and the front edge 35a of the rear covering 35 as a result of, for example, an error in shape, a fitting error and an aged deterioration, the possibility that the rider's clothing and boot may be caught in such a small gap can be prevented. In addition, as shown in FIG. 5, the rear edge 34a of the under-the-seat covering 33 is engaged with the front edge 35a of the rear covering 35 through the engagement piece 52, a mounting work is easy to perform and the assemblability can be increased.

The upper end 36a of the joint portion 36 shown in FIG. 1 is, when viewed from side, disposed spaced a distance below the seat 18. Accordingly, the upper end 36a of the joint portion 36 can be avoided from catching, for example, the rider's clothing and boot. Also, since the joint portion 36 extends diagonally rearwardly towards the upside, the upper end 36a of the joint portion 36 comes to assume a position rearwardly, and therefore, the possibility of, for example, the rider's clothing and boot being caught by the joint portion 36 can be further avoided.

Moreover, the upper end 36a of the joint portion 36 is so positioned as to lie within the region that is inclined rearwardly at an angle within the range of 15 to 35° relative to the base line L1 extending from the upper surface of the rider's footstep 31 in the vertical direction. In other words, the rear end of the under-the-seat covering 33, when viewed from side, is so positioned as to lie within the region R that is inclined rearwardly at an angle within the range of 15 to 35° relative to the base line L1. Accordingly, the upper end 36a of the joint portion 36, that is, the rear end of the under-the-seat covering 33 comes to be positioned rearwardly and, therefore, the possibility of, for example, the rider's clothing and boot being caught by this rear end can be avoided.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. By way of example, although in describing the foregoing preferred embodiment the motorcycle has been shown and described as of the motorcross type, the side covering body 40 of the present invention can be applied to any other motorcycle than the motorcrosser. It is, however, to be noted that the side covering body 40 of the present invention is particularly effectively utilized in the motorcycle of the motorcross type with which the rider, during the running, changes his or her attitude so frequently and widely.

Accordingly, such changes and modifications are, unless they depart from the scope of the present invention as delivered from the claims annexed hereto, to be construed as included therein.

REFERENCE NUMERALS

1a . . . Main frame
1c . . . Subframe
13 . . . Rear suspension
15 . . . Fuel tank
17 . . . Radiator
18 . . . Seat
30 . . . Air cleaner
31 . . . Rider's footstep
32 . . . Shroud portion
33 . . . Under-the-seat covering
35 . . . Rear covering
36 . . . Joint portion
40 . . . Side covering body
52 . . . Engagement piece
E . . . Combustion engine
FR . . . Vehicle frame structure
L1 . . . Base line

What is claimed is:

1. A side covering body for a motorcycle having a radiator disposed forwardly of a combustion engine, the side covering body being mounted on a side portion of a vehicle body of the motorcycle, which side covering body comprising:
    an under-the-seat covering configured to cover at least a vertical gap between a seat and a vehicle frame structure;
    a rear covering disposed rearwardly of the under-the-seat covering;
    a shroud portion formed in a front portion of the under-the-seat covering and configured to cover an outer side of the radiator to thereby guide an incoming wind towards the radiator; and
    an air cleaner disposed below an intermediate portion of the seat with respect to the forward and rearward direction, wherein:
    the under-the-seat covering and the rear covering are connected together through a joint portion, while having respective outer side surfaces flush with each other;
    the joint portion has an upper end that is disposed rearwardly of an intermediate portion of the seat with respect to a forward and rearward direction;
    the under-the-seat covering extends from at least a front end portion of the seat to a portion rearwardly of a front end portion of the air cleaner; and
    the under-the-seat covering has a rear portion supported by the air cleaner.

2. The side covering body for the motorcycle as claimed in claim 1, further comprising a fuel tank disposed above the combustion engine, the under-the-seat covering being supported by a front portion of the fuel tank.

3. The side covering body for the motorcycle as claimed in claim 2, in which the under-the-seat covering has an intermediate portion with respect to the forward and rearward directions, the intermediate portion being supported by the fuel tank.

4. The side covering body for the motorcycle as claimed in claim 1, in which the under-the-seat covering has a rear edge extending in an adjoining relationship with a front edge of the rear covering.

5. The side covering body for the motorcycle as claimed in claim 4, the rear edge of the under-the-seat covering is engaged with a front edge of the rear covering through an engagement piece.

6. The side covering body for the motorcycle as claimed in claim 1, further comprising a subframe of a substantially U-shaped configuration, when viewed from top, connected with a main frame, wherein the under-the-seat covering has a front portion supported by the subframe.

7. The side covering body for the motorcycle as claimed in claim 1, in which the joint portion has an upper end which is, when viewed from a lateral side, disposed spaced a distance below the seat.

8. The side covering body for the motorcycle as claimed in claim 7, in which the joint portion extends inclined rearwardly and upwardly.

9. The side covering body for the motorcycle as claimed in claim 1, in which the joint portion has an upper end which is, when viewed from a lateral side,
    so positioned as to lie within a region inclined rearwardly at an angle within the range of 15° to 35° relative to a base line extending in a vertical direction from an upper surface of a rider's footstep.

10. The side covering body for the motorcycle as claimed in claim 1, in which the under-the-seat covering has a rear end which is, when viewed from a lateral side, so positioned as to lie within a region inclined rearwardly at an angle within the range of 15° to 35° relative to a base line extending in a vertical direction from an upper surface of a rider's footstep.

11. A side covering body for a motorcycle having a radiator disposed forwardly of a combustion engine, the side covering body being mounted on a side portion of a vehicle body of the motorcycle, which side covering body comprising:
    an under-the-seat covering configured to cover at least a vertical gap between a seat and a vehicle frame structure;
    a rear covering disposed rearwardly of the under-the-seat covering; and
    a shroud portion formed in a front portion of the under-the-seat covering and configured to cover an outer side of the radiator to thereby guide an incoming wind towards the radiator, wherein:
    the under-the-seat covering and the rear covering are connected together through a joint portion, while having respective outer side surfaces that are flush with each other;

the joint portion has an upper end that is disposed rearwardly of an intermediate portion of the seat with respect to a forward and rearward direction; and the under-the-seat covering, when viewed from a lateral side, covers a lower end portion of the seat.

* * * * *